United States Patent [19]

Penny

[11] 3,995,367
[45] Dec. 7, 1976

[54] BEARING SEPARATOR AND SEALING SYSTEM FOR ROCK BIT

[75] Inventor: Samuel Lee Penny, Lancaster, Tex.

[73] Assignee: Dresser Industries, Inc., Dallas, Tex.

[22] Filed: Mar. 1, 1976

[21] Appl. No.: 662,489

[52] U.S. Cl. ............................................. 308/8.2
[51] Int. Cl.² ........................................ F16C 19/00
[58] Field of Search ................... 308/8.2, 217, 216

[56] References Cited

UNITED STATES PATENTS

| | | | |
|---|---|---|---|
| 71,973 | 12/1867 | Burnap | 308/217 X |
| 2,351,357 | 6/1944 | Miller et al. | 308/8.2 |
| 3,601,456 | 8/1971 | Becker | 308/8.2 |
| 3,720,274 | 3/1973 | McCallum | 308/8.2 |

Primary Examiner—Joseph F. Peters
Assistant Examiner—Gene A. Church
Attorney, Agent, or Firm—Eddie E. Scott

[57] ABSTRACT

The bearing capacity of a rotary rock bit is increased by providing a bearing separator and sealing system which maintains the cylindrical roller bearings in proper alignment without interfering with the integrity of the seal. A spacer unit is positioned around the bearing pin of the rock bit between the cutter member and the bearing pin. The spacer unit includes an annular body with a plurality of separator elements cantilevered from said annular body extending toward the outer end of the bearing pin. The cylindrical rollers are alternately positioned between the separator elements. The annular body of the spacer unit is located in the cone mouth of the cutter member. A seal member is located in the cone mouth of the cutter member between the rock bit body and the annular body of the spacer unit.

5 Claims, 2 Drawing Figures

BEARING SEPARATOR AND SEALING SYSTEM FOR ROCK BIT

BACKGROUND OF THE INVENTION

The present invention relates to the art of earth boring and more particularly to an improved sealed bearing rotary rock bit. The present invention is especially adapted for use in that type of rotary rock bit popularly known as a three-cone bit; however, its use is not restricted thereto, and the present invention can be used in other types of rotary rock bits.

A three-cone rotary rock bit is adapted to be connected as the lowest member of a rotary drill string. As the drill string is rotated, the bit disintegrates the earth formations to form an earth borehole. The three-cone rotary rock bit includes three individual arms that extend angularly downward from the main body of the bit. The lower end of each arm is shaped to form a spindle or bearing pin. A cone cutter is mounted upon each bearing pin and adapted to rotate thereon. Individual bearing systems promote rotation of the cone cutter. These bearing systems have traditionally been roller bearings, ball bearings, friction bearings, or a combination of the aforementioned bearings. In order to extend the lifetime of the bearing systems a lubricant is maintained in the bearing area. A seal in the mouth of the cone cutter retains the lubricant in the bearing area. The cone cutters include cutting structure on their outer surfaces that serve to disintegrate the formations as the bit is rotated.

The rotary rock bit must operate under very severe conditions, and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cones, thereby providing a longer useful lifetime for the cones. This has resulted in the bearing systems often being the first to fail during the drilling operation. Consequently, a need exists for an improved sealed bearing system to extend the useful lifetime of the bit.

In addition to rotational forces experienced by the bit, the bit is subjected to a thrust load during operation. The weight of the drill string and in some instances the downward force applied by the rotary drilling equipment apply a substantial thrust load to the bit. The thrust load in combination with the rotational forces tend to force the rollers into a position askew to the longitudinal axis of the bearing pin. Wear of the roller bearing races tends to exaggerate the skewing problem. The load experienced by the bearing system tends to be the greatest near the base of the cone. The base of te cone contains the gage cutting structure and the gage cutting structure encounters the most difficult cutting loads during the drilling operation.

DESCRIPTION OF PRIOR ART

In U.S. Pat. No. 3,102,601 to D. P. Worth, assigned to Phillips Petroleum Company, patented Sept. 3, 1963, an improved drill bit is shown. Specifically, the improvement relates to providing a drill bit having therein means for releasing drilling fluid at and for predetermined intervals from the face of a tooth on the cutter in order to thereby blow the detritus broken loose from the formation away from the cutter. It is preferred to use a compressed gas such as air for the drilling fluid that is released from the face of the tooth, but grit-free liquids may also be used. The radial loads are carried by the outboard bearings 40 and the inboard bearings 42. The inboard radial bearing comprises the roller bearings 42 spaced apart by the retainer 43. In some installations it may be possible to omit the spacers 41 and 43.

In U.S. Pat. No. 3,235,316 to J. R. Whanger, assigned to Hughes Tool Company, patented Feb. 15, 1966, a journal bearing for a rock bit is shown with alternating surface areas of wear-resistant and anti-galling materials. The bearing system disclosed in this patent includes grooves in one of the rotatable members and a soft metal having anti-galling characteristics positioned in the grooves.

In U.S. Pat. No. 3,601,456 to Myron D. Becker, patented Aug. 24, 1971, an antiskew device for ensuring proper alignment of roller bearings in roller cutter earth drilling bits is disclosed. The antiskew device aligns the roller bearings as they enter the race area where greatest force is applied to ensure that the force is applied equally along the surface of the roller bearings.

In U.S. Pat. No. 3,720,274 to H. F. McCallum, assigned to Dresser Industries, Inc., patented Mar. 13, 1973, intermdiate thrust elements are positioned between the cutters and the bearing pins of an earth boring bit. Each intermediate thrust element is located between a thrust surface on a bearing pin and a thrust surface on the associated cutter. The intermediate thrust elements aid stabilization of the rotating cutter, promote cutter rotation and extend the lifetime of the bit.

In U.S. Pat. No. 3,784,264 to G. C. Jackson, Jr., assigned to Dresser Industries, Inc., patented Jan. 8, 1974, an earth boring bit bearing system is shown. The bearing surface of one relatively rotatable member of a friction bearing is grit blasted to give it a roughened surface. A reservoir containing lubricant having entrained particles of anti-galling material is connected to the friction bearing and serves as a source of anti-galling material. Particles of the anti-galling material are picked up by the roughened surface and a film of anti-galling material formed on the bearing surface.

When reviewing non-analogous prior art, a substantial variety of designs of bearing systems will be noted. For example, in U.S. Pat. No. 71,973 to John A. Burnap, patented Dec. 10, 1867, an improvement in pulley-block including an open ended bearing cage is shown and in U.S. Pat. No. 3,582,164 to William Derner, patented June 1, 1971, a powdered metal bearing cage is shown.

SUMMARY OF THE INVENTION

The present invention assists in achieving a more uniform load distribution in a rock bit bearing during the drilling operation. The invention lowers contact stress by reducing misalignment between the rollers and the bearing races and preserves the integrity of the seal. The rollers are guided in such a way as to insure that the axes of the rollers remain parallel to the axis of the bearing pin and aligned with the bearing races to prevent skewing of the rollers during the drilling operation. The present invention also prevents the rollers from sliding against the seal or each other. The rollers are spaced symmetrically around the periphery of the bearing pin to help achieve a more uniform load distribution. Heat is dissipated from the bearing surfaces and the lubricant to assist in reducing the operating temperature of the bearing. A separator unit with cantilevered separator elements projecting between the rollers provides a more compatible material for the rollers to slide against and protects the seal. The above and other features and advantages of the present invention will become apparent from a consideration of the following detailed description of the invention when taken in conjunction with the drawings.

DETAILED DESCRIPTION OF THE INVENTION

Figure 1:
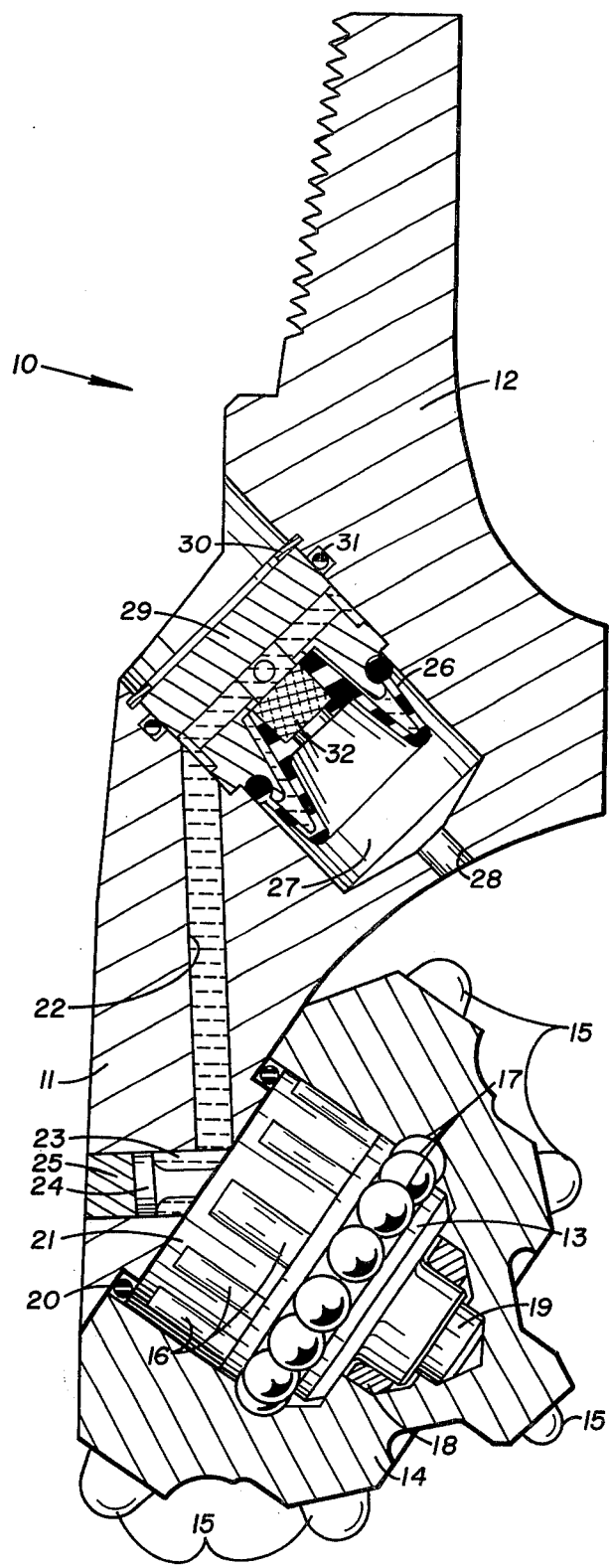
FIG. 1 illustrates one arm of an earth boring bit constructed in accordance with the present invention.

Referring now to the drawings and to FIG. 1 in particular, a sectional view of one arm of a sealed bearing rotary rock bit generally designated by the reference number 10 illustrating the present invention is shown. As illustrated, the arm 11 depends from the main body 12 of the bit 10. The bit 10 includes an upper threaded portion that allows the bit 10 to be connected to the lower end of a rotary drill string (not shown). The lower end of arm 11 is provided with an extended journal portion 13. A rotary cone cutter 14 is rotatably positioned upon the extended journal portion of arm 11. The cutter 14 includes cutting structure 15 on its outer surface adapted to disintegrate formations as the bit 10 is rotated and moved downward. The cutting structure 15 is shown in the form of tungsten carbide inserts. However, it is to be understood that other cutting structures such as steel teeth may be used as the cutting structure on the cone cutter 14.

The bit 10 includes a central passageway extending along the central axis of the bit 10 to allow drilling fluid to enter from the upper section of the drill string (not shown) immediately above and passed downward to the bottom of the well bore to flush cuttings and drilling debris from the well bore. A plurality of bearing systems are located in bearing area between the cutter 14 and the bearing pin 13. The bearing systems in the bearing area include a series of roller bearings 16, a series of ball bearings 17, a friction bearing 18, and a thrust button 19. A seal 20 is positioned between the cutter 14 and the arm 11.

The seal 20 retains lubricant in the bearing area around the bearings systems and prevents any material in the well bore from entering the bearings. A bearing cage 21 with cantilevered separator elements is positioned around the bearing pin 13. The separator elements are positioned between each of the rollers 16.

The lubrication system of the bit 10 includes a passage 22 that extends through the bearing pin 13 to the bearing area to allow lubricant be transmitted to the bearings systems. A passage 23 connected to the passage 22 allows the make up of the ball bearing system 17 by allowing the balls to be inserted into position after the cone cutter 14 is placed on the bearing pin 13. The series of ball bearings 17 serve to lock the cone cutter 14 on bearing pin 13. After the balls are in place, a plug 24 is inserted into the passage 23 and welded therein by a weld 25. The plug 24 has a reduced diameter throughout the major portion of its length to allow lubricant to be transmitted to the bearing area. Additional passages extend from passage 23 to the bearing area to insure a sufficient supply of lubricant to bearings 16, 17 and 18, and 19.

A lubricant reservoir is located in the bit body 12 to provide a supply of lubricant to the bearings. A flexible diaphragm 26 is positioned in the lubricant reservoir and encloses the reservoir to retain a supply of lubricant in the lubricant area. The area 27 within the reservoir bore but outside of the diaphragm 26 is vented to the dome of the bit by a passageway 28 that connects the lower end of the lubricant reservoir with the dome of the bit. The upper end of the lubricant reservoir is closed by a cap 29 and locked in place in the bit body 12 by a snap ring 30. An O-ring seal 31 is positioned around the cap 29 to retain lubricant in the lubricant reservoir. A free-breathing porous filter plug 32 extends through the flexible diaphragm 26. The free-breathing porous filter plug 32 provides fluid communication between lubricant in the lubricant area of the reservoir and fluid from the bore hole that has entered pressure equalizing portion of the lubricant reservoir. The plug 32 is in the form of compressed metal particles positioned within an open metal cylinder.

Figure 2:
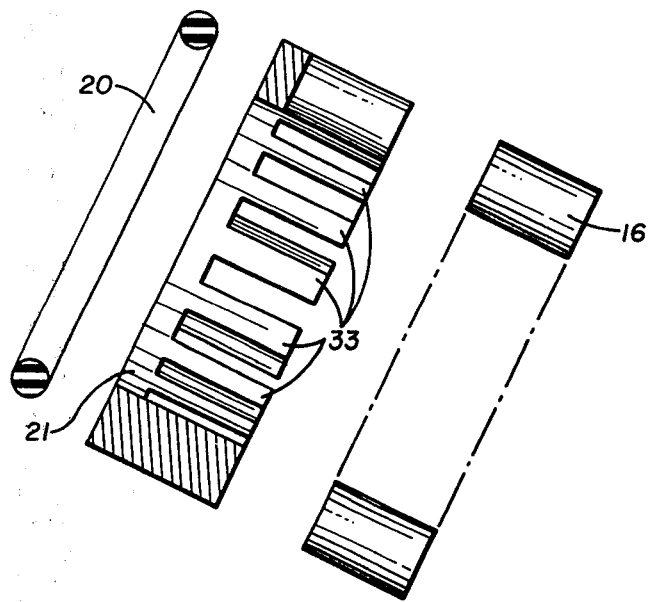
FIG. 2 is an exploded view of the seal and roller bearing system of the bearing system of the bit illustrated in FIG. 1.

Referring now to FIG. 2, the seal 20, bearing cage 21 and rollers 16 are shown in an exploded view. The bearing cage 21 includes cantilevered separator elements 33 that extend away from the seal 20. The separator elements 33 include concave surface portions that mate with the external surface of the cylindrical rollers 16. The separator elements 33 are self-aligning and tend to guide the rollers 16 and hold their axes parallel to the axis of the bearing pin 13. The annular body of the bearing cage 21 is positioned proximate the seal 20 with the cantilevered separator elements 33 extending toward the outer end of the bearing pin 13. This insures that the rollers 16 will not slide against the seal 20. The seal is thus protected and the lubricant is retained within the bit 10 without contamination.

The rollers 16 are hardened steel rollers of high wear resistance. In prior art rotary rock bits, the rollers were in contact with each other and in contact with other elements of hardened steel having high wear resistance. The sliding contact between the hardened steel rollers could create an undesirable condition that on occasions, would result in the eventual destruction of the rollers and ultimate failure of the bit. Since the surfaces of the adjcent hardened steel rollers that were in sliding contact would be moving in opposite directions and at a substantial relative speed, the sliding friction developed would be substantial.

The separator elements 33 of the present invention provide an element for the rollers 16 to slide against that does not add to the sliding motion. In addition, the separator elements 33 provide a material for the rollers 16 to contact that may be more compatible with the hardened steel rollers than in prior art bits. For example, the separator elements 33 are of a different metal than the hardened steel rollers 16. The separator elements 33 extend away from the seal 20 and the roller bearings 16 do not come into cntact with the seal 20.

The structural details of a rotary rock bit 10 constructed in accordance with the present invention having been described, the operation of the bit 10 will now be considered with reference to FIGS. 1 and 2. The bit 10 is connected as the lowest element of a rotary drill string by engaging the bit 10 with the drill string by the threaded connection. The bit 10 is rotated and thrust downward, thrusting the cutters against the earth formations. Continued rotation with the weight of the drill string applying a thrust force to the bit 10, causes the cutters to disintegrate the formations and form the desired borehole. The combination of rotary and thrust forces acts to tend to cause the rollers 16 to attempt to become askew to the central axis of the bearing pin 13 and the bearing races. The separator elements 33 of the bearing cage 21 serve to prevent the rollers 16 from becoming skewed and provides a material that may be more compatible with the material of the rollers than when the rollers are in direct contact with each other.

The lubrication system of the bit 10 is filled with a suitable lubricant and the area above the flexible diaphragm 26 is completely filled with lubricant. The flexible diaphragm 26 seals the lower end of the lubricant reservoir and is held in place by the lower portion of the cap 29. The bit 10 is lowered into a well bore until the cutter 14 contacts the earth formation at the bottom of the borehole. The hydrostatic pressure of fluid in the well bore is substantial and a pressure differential between the pressure of the lubricant inside of the bit 10 and the pressure fluid in the borehole will ordinarily develop. The lubrication system of the bit 10 allows the pressure of fluid in the well bore to be transmitted to the lubricant in the lubricant reservoir and the pressures are equalized as the bit 10 is moved through the borehole. Lubricant from the lubricant reservoir passes through passages 22 and 23 and is transmitted to the bearing systems including roller bearings 16 and separator elements 33 to extend the useful lifetime of the bit. The seal 20 is located between the body of the bearing cage 21 and the body of the bit 10. The seal 20 is thus protected and the useful lifetime of the bit 10 is extended.

The embodiments of the invention in which an exclusive property or privilege is claimed are defined as follows:

1. A rotary rock bit, comprising:
   a rock bit body;
   at least one bearing pin extending from said rock bit body, said bearing pin having an outer end positioned away from said rock bit body;
   a cone cutter member rotatably positioned over said bearing pin, said cutter member having a cone mouth positioned proximate said rock bit body;
   bearing means between said cutter member and bearing pin for promoting rotation of said cutter member, said bearing means including a plurality of cylindrical rollers positioned around said bearing pin between said bearing pin and said cutter member;
   a spacer unit positioned around said bearing pin between said cutter member and said bearing pin, said spacer unit including an annular body with a plurality of separator elements cantilevered from said annular body extending toward said outer end of said bearing pin, said cylindrical rollers alternately positioned between said separator elements and said annular body located in the cone mouth of said cutter member; and
   a seal member located in the cone mouth of said cutter member between said rock bit body and said annular body of said spacer unit.

2. A rotary rock bit, comprising:
   a rock bit body;
   at least one bearing pin extending from said rock bit body;
   a cone cutter member rotatably positioned on said bearing pin, said cone cutter including a cone cutter base positioned proximate said rock bit body;
   a bearing system between said bearing pin and cone cutter member, said bearing system including a plurality of cylindrical rollers positioned around said bearing pin between said bearing pin and said zone cutter member;
   an annular roller spacer and seal protector unit positioned around said bearing pin, said annular roller spacer and seal protector unit including an annular main body with a plurality of separator elements cantilevered from said main body, said separator elements alternately positioned between said cylindrical rollers; and
   a seal element located between said rock bit body and said main body of said roller spacer and seal protector unit.

3. A rotary rock bit, comprising:
   a rock bit body;
   at least one bearing pin extending from said rock bit body, said bearing pin having a longitudinal axis;
   a cutter member rotatably positioned on said bearing pin;
   a plurality of cylindrical rollers positioned around said bearing pin between said bearing pin and said cutter member, said cylindrical rollers having a longitudinal axis with the longitudinal axis of the cylindrical rollers being substantially parallel to the longitudinal axis of said bearing pin;
   a spacer positioned on said bearing pin, said spacer comprising a plurality of separator elements extending in cantilever fashion from an annular ring and alternately positioned between said cylindrical rollers; and
   a seal positioned around said bearing pin between said rock bit body and said annular ring, said annular ring being between said seal and said rollers, thereby preventing said rollers from contacting said seal.

4. A rotary rock bit, comprising:
   a rock bit body;
   at least one bearing pin extending from said rock bit body, said bearing pin having a longitudinal axis and an outer end spaced from said rock bit body;
   a cutter member rotatably positioned on said bearing pin;
   a plurality of cylindrical rollers positioned around said bearing pin between said bearing pin and said cutter member, said cylindrical rollers having a longitudinal axis with the longitudinal axis of the cylindrical rollers being substantially parallel to the longitudinal axis of said bearing pin;
   a seal element positioned between said bearing pin and said cutter member; and
   a spacer positioned on said bearing pin, said spacer comprising a plurality of separator elements extending in cantilever fashion from an annular ring, said cylindrical rollers being alternately positioned between said separator elements with the annular ring being positioned between said cylindrical rollers and said seal.

5. A rotary rock bit, comprising:
   a rock bit body;
   at least one bearing pin extending from said rock bit body, said bearing pin having a longitudinal axis and an outer end spaced from said rock bit body;
   a cutter member rotatably positioned on said bearing pin;

a plurality of cylindrical rollers positioned around said bearing pin between said bearing pin and said cutter member, said cylindrical rollers having a longitudinal axis with the longitudinal axis of the cylindrical rollers being substantially parallel to the longitudinal axis of said bearing pin;

a seal element positioned around said bearing pin; and a bearing cage positioned around said bearing pin, said bearing cage comprising a plurality of separator elements extending in cantilever fashion from an annular ring toward said outer end with said annular ring being located between said cylindrical rollers and said seal and said separator elements alternately positioned between said cylindrical rollers.

* * * * *

UNITED STATES PATENT OFFICE
CERTIFICATE OF CORRECTION

Patent No. 3,995,367      Dated December 7, 1976

Inventor(s) Samuel Lee Penny

It is certified that error appears in the above-identified patent and that said Letters Patent are hereby corrected as shown below:

Column 6, line 8, delete "zone" and add -- cone --.

Signed and Sealed this

Fifteenth Day of February 1977

[SEAL]

Attest:

RUTH C. MASON
*Attesting Officer*

C. MARSHALL DANN
*Commissioner of Patents and Trademarks*